Sept. 19, 1950  E. A. GLYNN  2,522,819
MACHINE FOR PREPARING TIRES FOR RETREAD VULCANIZING
Filed April 23, 1949  4 Sheets-Sheet 1
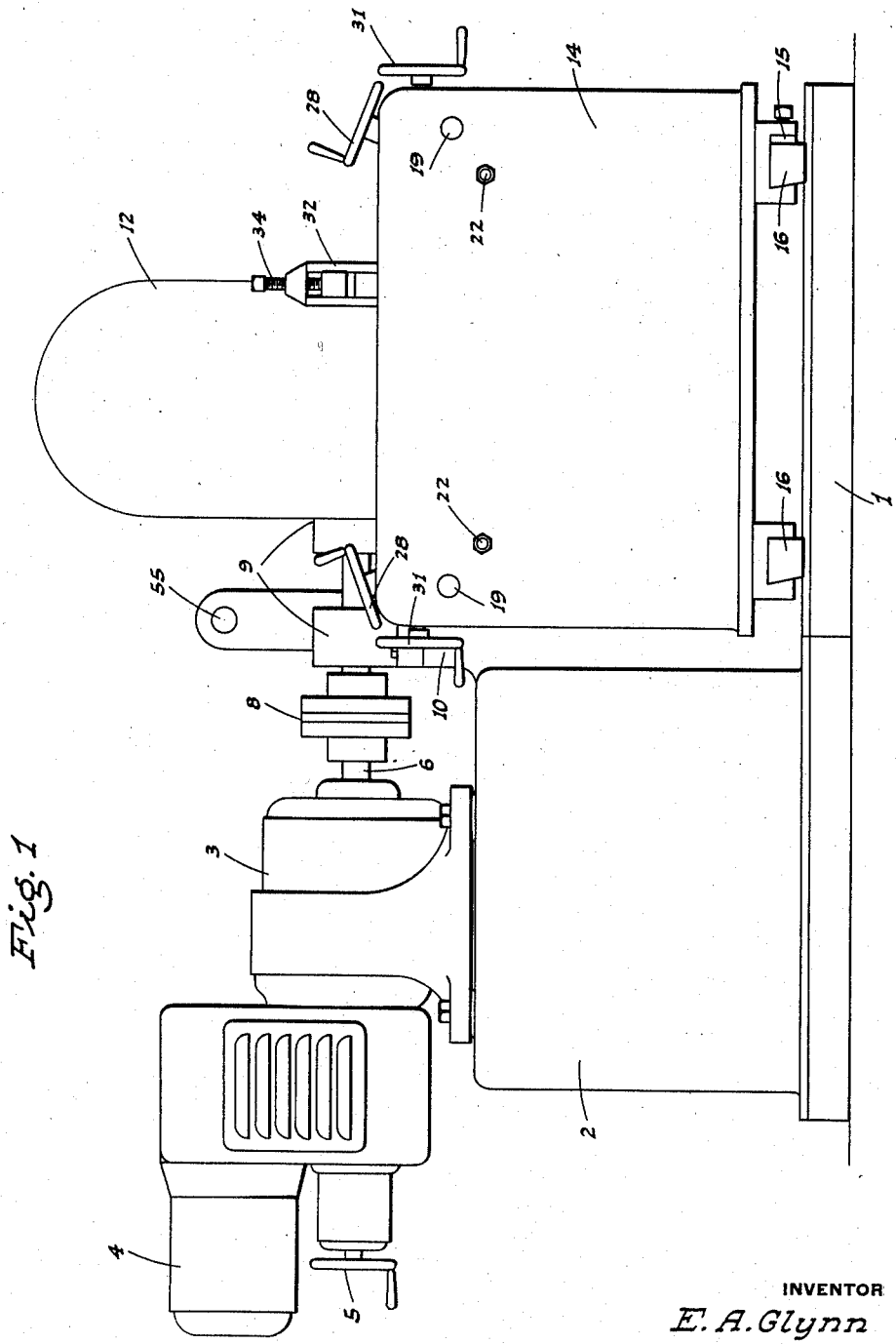
INVENTOR
E. A. Glynn Sept. 19, 1950     E. A. GLYNN     2,522,819
MACHINE FOR PREPARING TIRES FOR RETREAD VULCANIZING
Filed April 23, 1949     4 Sheets-Sheet 2
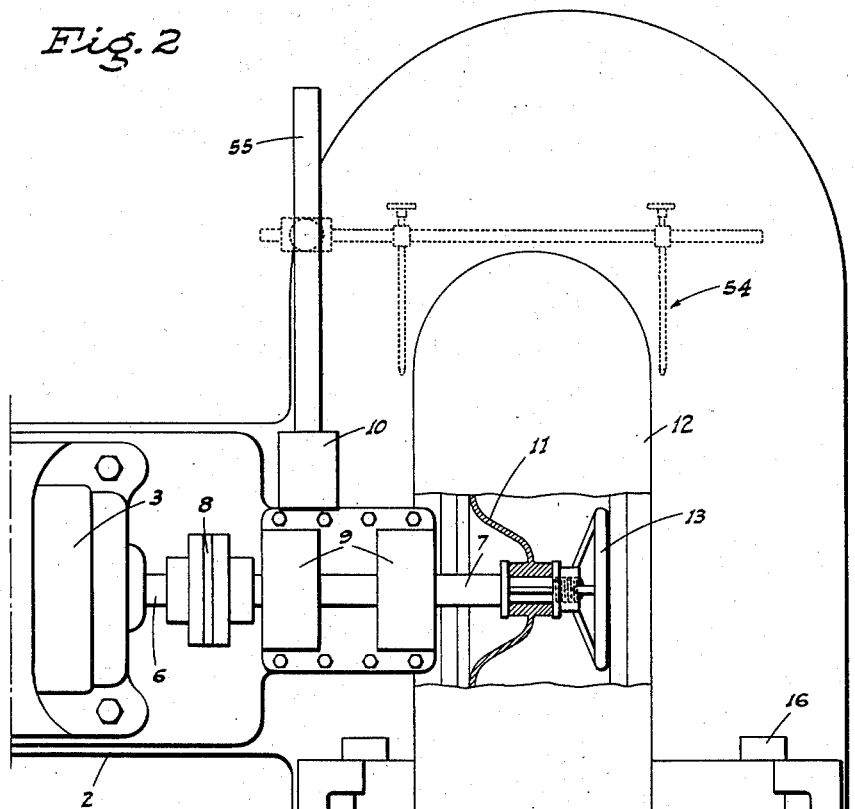
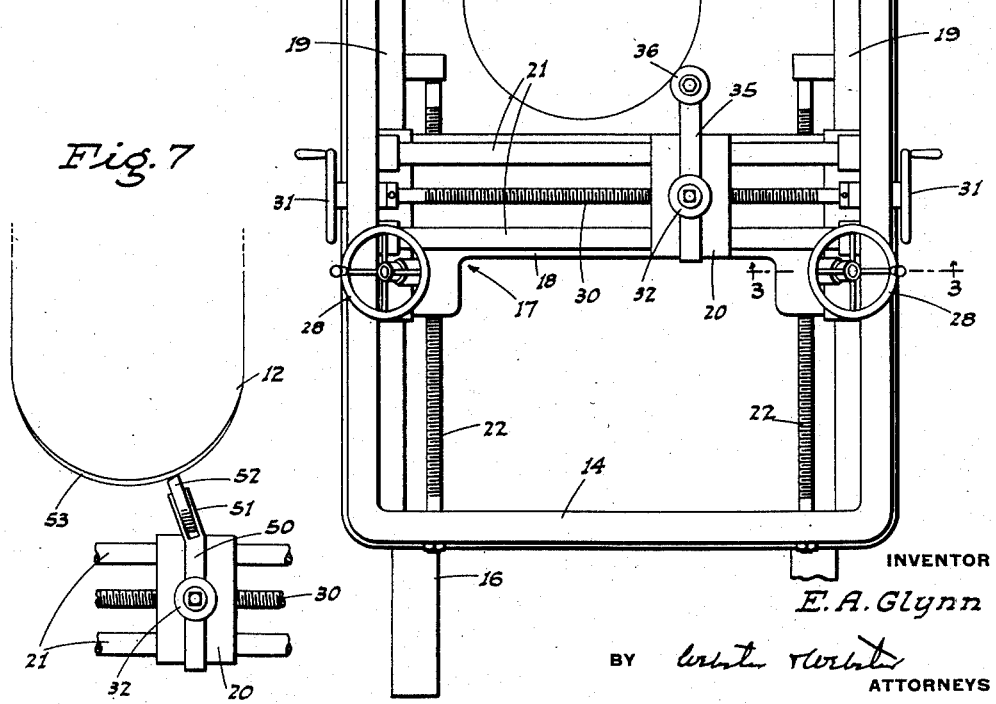
INVENTOR
E. A. Glynn
BY
ATTORNEYS Sept. 19, 1950          E. A. GLYNN          2,522,819
MACHINE FOR PREPARING TIRES FOR RETREAD VULCANIZING
Filed April 23, 1949          4 Sheets-Sheet 3
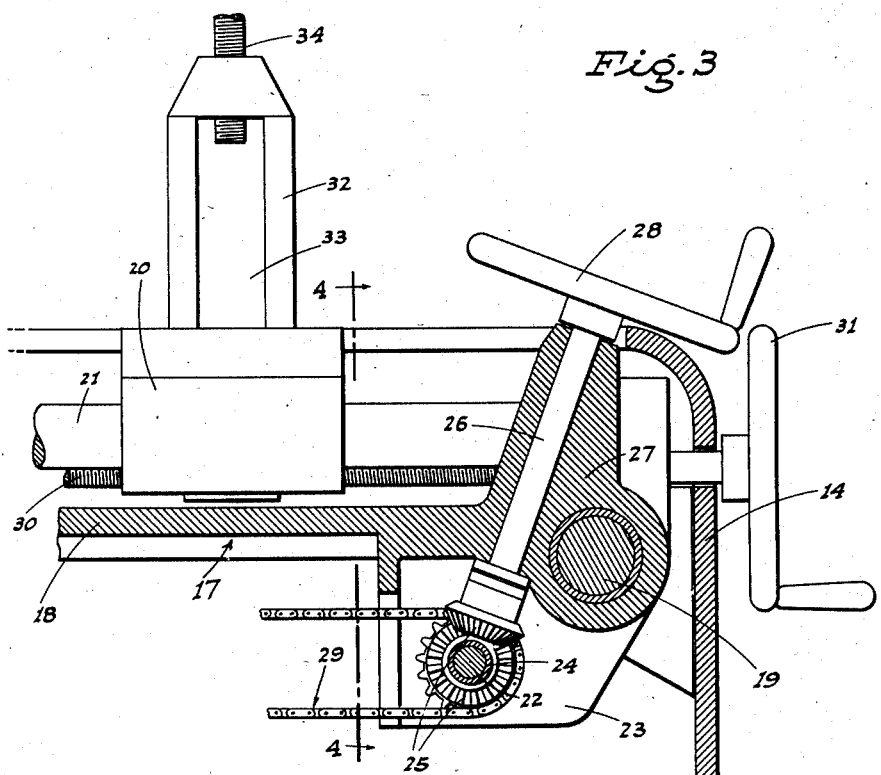
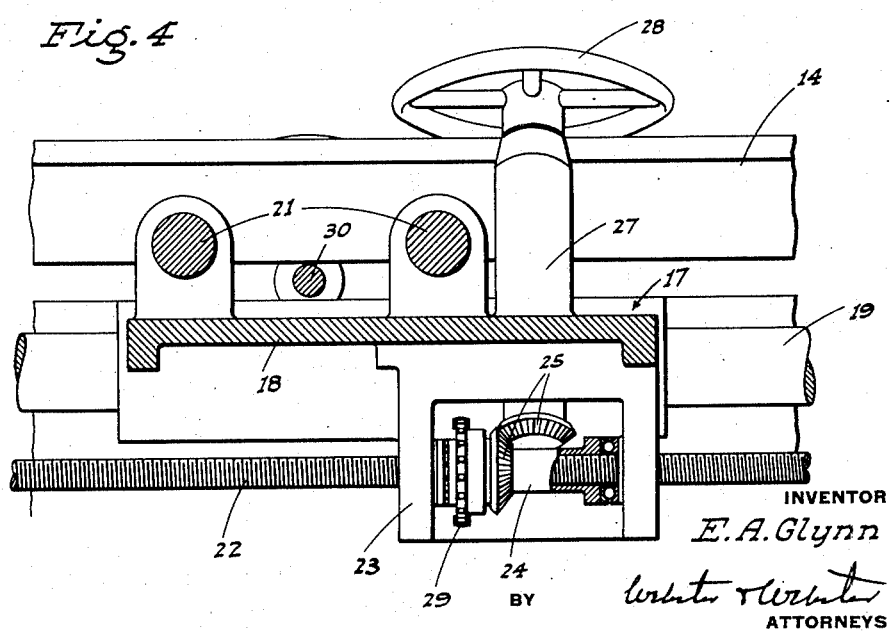
INVENTOR
E. A. Glynn
BY
ATTORNEYS INVENTOR
E. A. Glynn Patented Sept. 19, 1950

2,522,819

UNITED STATES PATENT OFFICE 2,522,819

MACHINE FOR PREPARING TIRES FOR RETREAD VULCANIZING

Edwin A. Glynn, Lodi, Calif., assignor to Super Mold Corporation of California, Lodi, Calif., a corporation of California Application April 23, 1949, Serial No. 89,234

7 Claims. (Cl. 154—9)

The present invention provides a novel, power actuated machine for smoothly, accurately, and rapidly removing the old tread from a worn motor vehicle tire by cutting and buffing, and for subsequently positively applying or "stitching" the new tread rubber or camel-back on the detreaded and buffeted tire in proper alinement thereon preparatory to vulcanizing the camelback as a new tread on said tire.

The invention also provides a machine, as above, which is especially designed, but not limited, for use in preparing large-size tires for retread vulcanizing, as—for example—truck or earthmover tires.

Additionally, the invention provides a tire preparing machine which includes a novel adjustable carriage which rigidly supports the tire working devices for advancing, retracting, and traversing motions relative to the tire; the latter being rotatably mounted and power driven for moving peripheral engagement with said devices.

Further, the invention provides a carriage assembly, as in the preceding paragraph, which is adapted to mount, selectively, a tire tread removing cutter; a power driven buffer unit; and a camelback stitcher.

Another feature of the invention is the provision of controls, for the carriage assembly, which are conveniently manually accessible from either side of the machine; this making it possible for the operator to stand at a station affording the best view of the portion of a tire being worked upon.

A still further advantage of the machine is that all of the steps of preparing a tire for retreading; i. e. tread removal, buffing, and application of camelback, can be accomplished with the tire as mandrel supported in the machine, thus minimizing handling of the tire and expediting the process of retreading.

It is also an object to provide a tire preparing machine which is rugged in construction and subject to a minimum of wear and tear when in operation.

A further object of the invention is to provide a practical and reliable tire preparing machine, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the machine with a tire mounted therein.

Fig. 2 is a top plan view of the machine with a tire therein; the tire being partly broken away and the demountable tire supporting wheel being partly in section.

Fig. 3 is an enlarged fragmentary cross section on line 3—3 of Fig. 2.

Fig. 4 is a fragmentary cross section on line 4—4 of Fig. 3.

Fig. 7 is a fragmentary plan view of the carriage assembly, showing particularly the camelback stitcher as mounted in connection with the traversing carriage.

Figure 5:
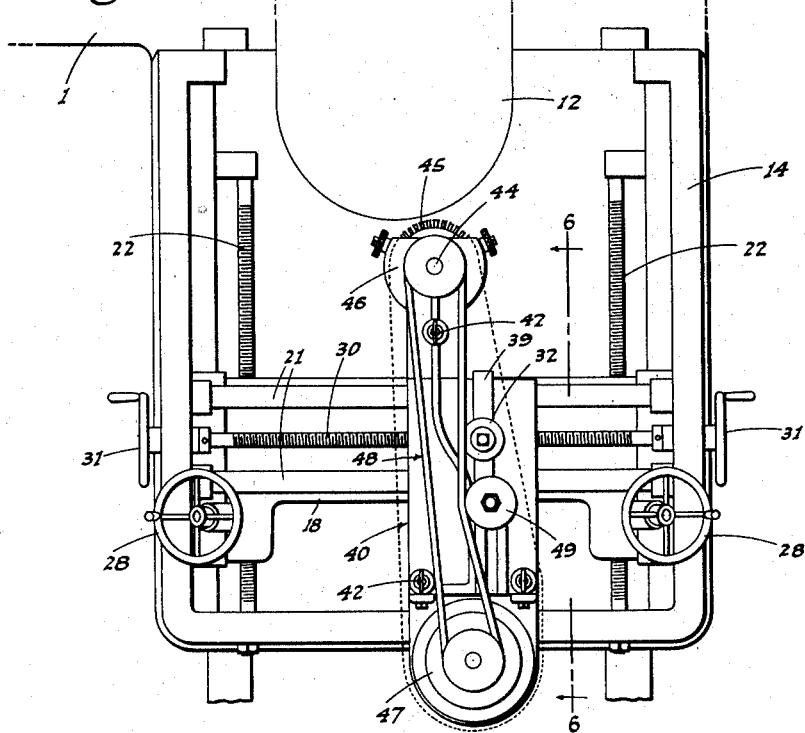
Fig. 5 is a fragmentary top plan view of the machine illustrating the power driven buffer unit as mounted on the carriage assembly for use.

Referring now more particularly to the characters of reference on the drawings, the machine comprises a flat elongated base 1 having a lateral extension which supports a pedestal 2. A variable speed, reduction gear box 3 driven by an electric motor 4 is mounted on the pedestal, and is adjustable through the medium of a control wheel 5.

The output shaft 6 of the gear box 3 projects horizontally transversely of the base 1 and is connected, in driving relation, to an alined horizontal shaft or mandrel 7, by means of a coupling 8. The mandrel 7 is journaled in bearings 9 atop a post structure 10 which upstands from the base 1, and said mandrel projects free some distance beyond the bearings 9 in a direction opposite the coupling 8, and in overhanging relation to the base 1.

At its free end portion the mandrel 7 is provided with a demountable tire supporting wheel 11 adapted to receive the tire 12 for detreading and subsequent work thereon.

A hand wheel 13 is provided to demountably maintain the tire supporting wheel 11 in place on the mandrel 7. As so supported, a tire 12 is disposed above the base 1 intermediate the sides thereof, and said tire is rotated, from the gear box 3 and by the mandrel 7, in a vertical longitudinal plane with respect to said base 1.

Beyond the tire supporting wheel 11, in one direction lengthwise of the base 1, the machine includes an upstanding, somewhat box-like frame 14 which is rectangular in configuration; being open at the top and at the end adjacent the tire 12. This upstanding, box-like frame 14 is mounted in connection with the elongated base 1, for adjustment lengthwise thereof, by means of clamps 15 secured to transversely spaced, longitudinal ways 16 on said base.

The upstanding frame 14 is normally fixed, relative to the base 1, and supports the following adjustable carriage assembly, which carriage assembly is indicated generally at 17.

The carriage assembly 17 comprises a main, transverse, longitudinally movable carriage 18 which extends within the frame 14 adjacent the top thereof; such main carriage 18 being slidably supported, at opposite ends, by longitudinal shafts 19 mounted in said frame 14.

A traversing carriage 20 is mounted on the main carriage 18, for transverse movement with respect to the frame 14, by means of fixed cross shafts 21 extending through said traversing carriage 20 in relatively slidable relation.

The main carriage 18 is advanced or retracted manually from either side of the upstanding frame 14 by means of the following mechanism:

A pair of transversely spaced, longitudinal feed screws 22 are fixed in the upstanding frame 14 below the main carriage 18; the latter having depending forks 23 through which the feed screws 22 extend in relatively movable relation. Between the legs of each fork 23 the corresponding feed screw 22 is fitted with a rotary nut assembly 24 threaded thereon and adapted to be driven by a bevel pinion unit 25. A shaft 26 extends upwardly from each bevel pinion unit 25 through a suitable bearing part 27 on the carriage 18, and at its upper end each shaft 26 is fitted with a hand wheel 28.

The rotary nut assemblies 24 on the separate feed screws 22 are interconnected for simultaneous rotation by an endless chain and sprocket unit 29, so that when either hand wheel 28 is operated, both of the nut assemblies rotate simultaneously to advance or retract the main carriage 18. During the detreading and other operations on the tire 12, it is desirable that the operator have a station part of the time at one side of the upstanding frame 14 and part of the time at the opposite side. Therefore, the above described arrangement for actuation of the main carriage 18 from either side of said frame 14 is of great advantage.

The traversing carriage 20 has a transverse screw 30 threaded therethrough, and at opposite ends said screw is turnably but axially immovably secured in connection with the main carriage 18 and projects through longitudinal slots, as shown, in opposite sides of the frame 14. Hand wheels 31 are mounted on opposite end of said transverse screw 30 exteriorly of the corresponding sides of the frame 14. Here again is provision for the operator to control a part of the carriage assembly, to-wit the traversing carriage 20, from either side of the upstanding frame 14.

Corresponding hand wheels 28 and 31 are in adjacent relationship for convenience of selective use.

The traversing carriage 20 has an upstanding tool post 32 fixed thereon; said tool post being horizontally slotted therethrough, as at 33, and having a holding screw 34 threaded vertically through its upper end.

For detreading a tire 12 supported on the wheel 11, a tool mounting bar 35 is secured in the slotted tool post 32 by the screw 34, and projects toward said tire. At its outer end the tool mounting bar 35 is fitted with a cup-type, vertical-axis, rotary cutter 36. The tire 12 is rotated, by the driving mechanism hereinbefore described, at a relatively slow speed, and with the portion of the tire adjacent the carriage assembly turning in a downward direction. The operator then manipulates said carriage assembly 17 to cause the rotary cutter 36 to slowly travel across the tire from one side thereof in conforming relation to the cross sectional curvature of the tire carcass. With such travel of the rotary cutter 36, it effectively cuts away the old worn tread of the tire. By virtue of the fact that the carriage assembly 17 includes a longitudinally adjustable main carriage 18 and a traversing carriage 20, very accurate detreading can be accomplished.

After the old and worn tread of the tire is removed, the tool mounting bar 35 is detached from the tool post 32, and the following power driven buffer unit is substituted thereon.

Figure 6:
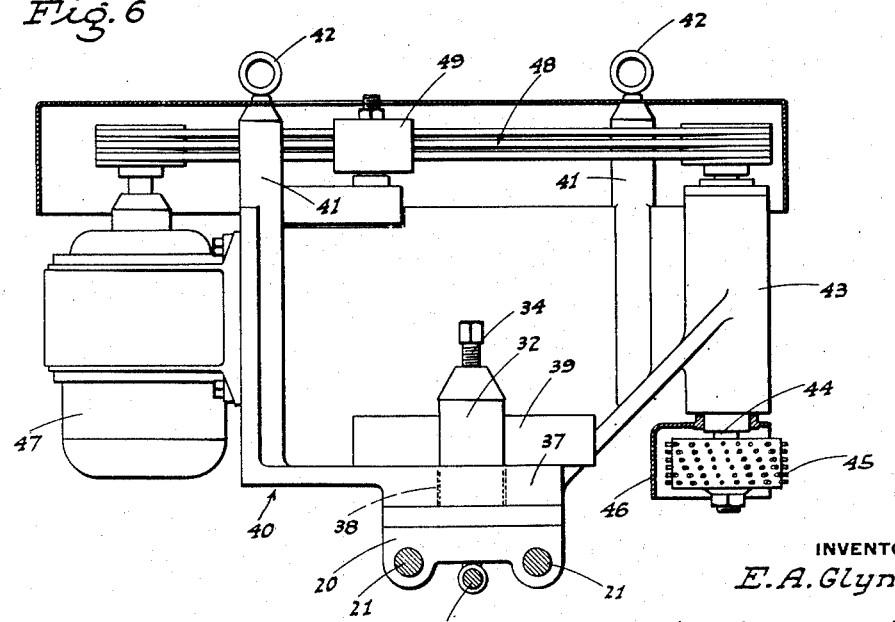
Fig. 6 is an enlarged side elevation of said power driven buffer unit.

The power driven buffer unit is shown in detail in Figs. 5 and 6, and comprises a horizontal base plate 37 vertically slotted, as at 38, whereby said base plate may rest directly atop the traversing carriage 20, with the tool post 32 projecting upwardly through said slot 38. A hold-down bar 39 extends through the slot above the base plate 37, and is forcefully engaged with the same from above by means of the holding screw 34.

The base plate 37 supports a rigid, upstanding frame structure, indicated generally at 40, which includes front and rear posts 41, and said posts include lifting eyes 42 at their upper ends. These lifting eyes 42 serve to facilitate placement or removal of the buffer unit on or from the machine by a power hoist or the like.

The frame structure 40 extends lengthwise when the proper unit is mounted on the traversing carriage 20, and at its front end said frame structure 40 includes a vertical bearing sleeve 43 in which a spindle 44 is journaled. At its lower end clear of the bearing sleeve 43 the spindle 44 is fitted with a rotary rasp 45 enclosed, at the sides and rear, by a shield 46 but exposed at the front.

A vertical axis, electric motor 47 is mounted on the rear end of the frame structure 40 and drives the spindle 44, at the upper end of the latter, by a multiple endless belt and pulley unit 48.

The numeral 49 indicates a belt tightener cooperating with the belts of unit 48.

When the described buffer unit is mounted on the traversing carriage 20, and the electric motor 47 is in operation, the rotary rasp 45 is driven at relatively high speed.

With the tire 12 being turned by the mandrel 7, the operator manipulates the carriage assembly 17 to cause the rotating rasp 45 to work its way transversely across the detreaded portion of the tire, whereby to effectively remove all excess tread and to smooth said portion of the tire. This is what is known as "buffing" the detreaded tire.

After the detreaded tire has been buffed, the buffer unit is removed by detaching the hold-down bar 39, and is set aside. Thereafter, a camelback stitcher is attached to the traversing carriage 20; being shown in Fig. 7, and comprising a mounted bar 50 which is secured in the tool post 32 by the holding screw 34. At the end adjacent the tire 12 the mounting bar 50 is formed with a fork 51 in which a stitching roller 52 is turnably mounted; said stitching roller 52 projecting ahead of the fork.

With the above camelback stitcher free of the tire 12, a full-width strip of new tread rubber of camelback 53 is applied, with suitable adhesive, to the tread portion of the tire 12; such application of the camelback being made in proper alinement by a guide unit, indicated generally at 54, supported by an arm 55 on the post structure 10. Thereafter, with the tire 12 rotating, with the camelback 53 thereon, the carriage assembly 17 is manipulated by the operator to cause the stitching roller 52 to work its way back and forth across such camelback in order to positively adhere it to the tire and to work out any entrapped air, as is necessary preparatory to vulcanizing said camelback onto the tire.

The machine, as above described, is practical, reliable, and convenient for the detreading, buffing and camelback applying operations necessary to tire retreading; a substantial advantage being gained by virtue of the accomplishment of all of said steps without removing the tire from the machine. Thus, handling of the tire is minimized, and the preparation of such tire for retread vulcanizing is facilitated.

From the foregoing description it will be readily seen that there has been produced such a device as substantially fulfills the objects of the invention, as set forth herein.

While this specification sets forth in detail the present and preferred construction of the device, still in practice, such deviations from such detail may be resorted to as do not form a departure from the spirit of the invention, as defined by the appended claims.

Having thus described the invention, the following is claimed as new and useful, and upon which Letters Patent are desired:

1. In a machine for preparing tires for retread vulcanizing, which includes a base and a power driven tire supporting wheel rotatably supported above the base; a frame upstanding from the base radially beyond the tire supporting wheel, a main carriage slidably mounted on the frame for advancing or retracting movements relative to said tire supporting wheel, hand controlled means operative to cause said main carriage to advance or retract, another carriage slidably mounted on the main carriage for transverse motion relative to the tire supporting wheel, other hand controlled means operative to cause said other carriage to traverse, and means adapted to mount a tire working tool on said other carriage; said first named hand controlled means including a pair of longitudinal, transversely spaced feed screws fixed in connection with the upstanding frame, a nut assembly on each screw rotatably but relatively axially fixed in connection with the main carriage, motion transmitting connections between the nut assemblies operative to rotate one from the other, hand wheels mounted on the main carriage adjacent opposite sides of the upstanding frame, and connections between the hand wheels and corresponding nut assemblies to rotate the latter.

2. A machine, as in claim 1, in which said motion transmitting connections between the nut assemblies include an endless chain and sprocket unit.

3. In a machine for preparing tires for retread vulcanizing, which includes a base and a power driven tire supporting wheel rotatably supported above the base; a frame upstanding from the base radially beyond the tire supporting wheel, a main carriage slidably mounted on the frame for advancing or retracting movements relative to said tire supporting wheel, another carriage slidably mounted on the main carriage for transverse motion relative to the tire supporting wheel, mechanism including duplicate sets of hand wheels supported in and movable with the main carriage on opposite sides of the upstanding frame and operative to cause the main carriage to advance or retract, or to cause the other carriage to traverse, selectively, and means adapted to mount a tire working tool on said other carriage.

4. A machine, as in claim 3, in which the upstanding frame is box-like, and said other carriage actuating mechanism includes a transverse screw journaled on the main carriage and operative to cause traversing of said other carriage, the opposite sides of the boxlike frame being longitudinally slotted and the screw projecting therethrough, and hand wheels on the ends of said screw exteriorly of the box-like frame.

5. A machine for preparing tires for retread vulcanizing comprising the combination with a mandrel for supporting and rotating a tire, of a base, a substantially rectangular frame supported on the base, said frame being open at one end and such open end being disposed adjacent the mandrel in such position that a tire on the mandrel may be projected into the frame between the sides thereof, a shaft mounted adjacent and along each side of the frame, a main carriage slidable on the shafts, manually operative means to move the carriage along the shafts, a pair of cross shafts mounted on the main carriage at substantially right angles to the first named shafts, a tool carriage mounted for sliding movement on the second named shafts, manually operative means to move the tool carriage along the second named shafts; and means for mounting a tire working tool on the tool carriage.

6. A machine as in claim 5 in which the means for moving the main carriage includes a feed screw mounted in the frame in substantial parallelism with the first named shafts, a member fixed to and depending from the main carriage, a rotary nut carried by said member, the feed screw being threaded through said nut, a vertically disposed shaft journaled in the main carriage and projecting at its upper end to a point at one side of the frame, a hand wheel on the upper end of the vertical shaft, a gear on the nut, and a gear on the lower end of the vertical shaft meshing with said first named gear.

7. A machine as in claim 6 in which the means for moving the second carriage includes a feed screw threaded through the carriage in substantial parallelism with the second named shafts, the frame having a slot in the side thereof substantially parallel to the first named shafts, said last named feed screw projecting through the slot at a point adjacent the hand wheel on the vertical shaft, and a hand wheel on said last named feed screw.

EDWIN A. GLYNN.

REFERENCES CITED

The following references are of record in the file of this patent:

UNITED STATES PATENTS

| Number | Name | Date |
|---|---|---|
| 2,009,524 | Schmidt | July 30, 1935 |
| 2,364,384 | Oakes | Dec. 5, 1944 |
| 2,366,685 | Chambers | Jan. 2, 1945 |

FOREIGN PATENTS

| Number | Country | Date |
|---|---|---|
| 507,388 | Great Britain | June 14, 1939 |